United States Patent
Gadelmeier et al.

(10) Patent No.: US 8,069,550 B2
(45) Date of Patent: Dec. 6, 2011

(54) METHOD FOR PROVIDING TOOTH HALVES WITH REMOVABLE TOOTH TIPS FOR AN ELECTRICAL MACHINE

(75) Inventors: Michael-Adolf Gadelmeier, Augsburg (DE); Michael Menhart, Igling (DE)

(73) Assignee: Siemens Aktiengesellschaft, München (DE)

( * ) Notice: Subject to any disclaimer, the term of this patent is extended or adjusted under 35 U.S.C. 154(b) by 446 days.

(21) Appl. No.: 12/294,564

(22) PCT Filed: Feb. 16, 2007

(86) PCT No.: PCT/EP2007/051516
§ 371 (c)(1),
(2), (4) Date: Sep. 25, 2008

(87) PCT Pub. No.: WO2007/110279
PCT Pub. Date: Oct. 4, 2007

(65) Prior Publication Data
US 2010/0072831 A1    Mar. 25, 2010

(30) Foreign Application Priority Data
Mar. 28, 2006   (DE) .................. 10 2006 014 343

(51) Int. Cl.
*H02K 15/00* (2006.01)
(52) U.S. Cl. .................. 29/596; 29/605; 310/12.21
(58) Field of Classification Search ............ 29/596–598, 29/605–606, 732–736; 310/12–14, 49 R, 310/51, 12.21–14
See application file for complete search history.

(56) References Cited

U.S. PATENT DOCUMENTS

| | | | |
|---|---|---|---|
| 3,445,702 A | 5/1969 | Silva | |
| 4,286,180 A * | 8/1981 | Langley | 310/12.27 |
| 4,335,338 A | 6/1982 | Sawyer | |
| 5,422,530 A * | 6/1995 | Nolle | 310/257 |
| 5,642,013 A * | 6/1997 | Wavre | 310/216.112 |
| 6,522,035 B1 | 2/2003 | Smit | |
| 2005/0082934 A1* | 4/2005 | Kawai | 310/181 |

FOREIGN PATENT DOCUMENTS

| | | |
|---|---|---|
| DE | 42 41 085 A1 | 6/1993 |
| DE | 102 29 333 A1 | 1/2004 |
| EP | 0915553 A2 | 5/1999 |
| JP | 03045147 * | 2/1991 |
| WO | WO 2007/033857 A1 | 3/2007 |

* cited by examiner

*Primary Examiner* — Minh Trinh
(74) *Attorney, Agent, or Firm* — Henry M. Feiereisen; Ursula B. Day

(57) ABSTRACT

In a method for constructing a linear motor, each tooth of a plurality of teeth is provided with two separate tooth halves with removable tooth tips. After removing the tooth tips to expose an open end of the tooth halves, a prewound coil is pushed over the open end of the two tooth halves of each tooth up to an end position, and a magnet is inserted between the two tooth halves of each tooth. The tooth halves have a thickness between the open end and the end position which does not exceed a thickness of the tooth halves at the end position.

6 Claims, 3 Drawing Sheets

METHOD FOR PROVIDING TOOTH HALVES WITH REMOVABLE TOOTH TIPS FOR AN ELECTRICAL MACHINE

BACKGROUND OF THE INVENTION

The invention relates to a method for constructing an electrical machine, in particular a linear motor. The invention also relates to tooth halves for a tooth of an electrical machine which make it possible to implement the method according to the invention.

In more recent linear motors, both coils and magnets are provided on a primary part (which corresponds to a stator), while the secondary part (which corresponds to the rotor) does not have any separate magnets.

The coils surround in each case two tooth halves, which each have a so-called tooth tip, which is used for guiding the magnetic flux.

In the prior art it is not possible to apply prewound coils onto the tooth halves since the tooth tip is so wide on the tooth tip side that coils are prevented from being plugged on, while the side remote from the tooth tip does not have a free end, with the result that it would be possible for a coil to be plugged on. This makes assembly more difficult when using tooth halves with tooth tips.

A linear motor with such tooth halves is generally fitted in such a way that first the magnets are positioned between the tooth halves. Then the coils are wound around the tooth halves.

This type of fitting is laborious. As a result of the permanent magnets being introduced early, component parts can be magnetized, which results in problems during fitting, and may even bring about a risk of injury for the fitter.

SUMMARY OF THE INVENTION

The object of the invention is to simplify the fitting of a linear motor when using tooth halves with tooth tips.

According to one aspect of the present invention, the object is achieved by a method for constructing an electrical machine, in particular a linear motor, having the steps of providing a plurality of teeth, which each comprise two separate tooth halves with tooth tips, wherein the tooth halves are shaped or capable of being modified in such a way that the following steps are made possible: pushing in each case one prewound coil over an open end of the two tooth halves of a tooth up to an end position, inserting a magnet (22; 46; 70) in each case between the two tooth halves of a tooth.

According to another aspect of the present invention, the object is achieved by a tooth half for a tooth of an electrical machine, in particular a linear motor, with a tooth tip, which has a free end, and on which a desired position for a coil surrounding in each case two identical such tooth halves is defined, wherein the tooth half is shaped in such a way that its thickness from the free end up to the desired position does not exceed the thickness of a desired position, with the result that, when the electrical machine is fitted on two identical such tooth halves, a prewound coil can be pushed on from the free end up to the desired position.

According to yet another aspect of the present invention, the object is achieved by a tooth half for a tooth of an electrical machine, in particular a linear motor, with a removable tooth tip.

According to the invention, a plurality of teeth, which each comprise two separate tooth halves with tooth tips, is therefore provided, the tooth halves being shaped or being capable of being modified in such a way that the following steps are made possible: pushing in each case one prewound coil over an open end of the two tooth halves of a tooth up to an end position, and inserting a magnet in each case between the two tooth halves of a tooth. In particular, it is now possible to implement the steps in the described sequence, with the result that the magnets do not need to be inserted until right at the end. The fitting speed is also increased and fitting is overall facilitated by virtue of the fact that the coil can be prewound. This is enabled by the shape or capability of the tooth halves to be modified.

In a preferred embodiment, the shape of the tooth halves is such that they have an open end, and that the tooth halves have a thickness between the open end and the end position which does not exceed the thickness of the tooth halves at the end position. The term thickness in this case relates to the extent of the tooth half in that dimension of the three dimensions provided in which the tooth half extends the least. This is particularly evident in the case of a plate-shaped basic body of the tooth half in which the thickness is naturally defined.

The capability of the tooth halves to be modified can also be such that the tooth halves have a removable tooth tip. When modifying the tooth halves by removing the tooth tip, in each case an open end is provided on the tooth halves, the tooth halves having a thickness between the open end and the end position which does not exceed the thickness of the tooth halves at the end position.

Even when the same terms are used here, the two preferred embodiments differ in the position of the open end. Firstly, the open end is positioned on that side of the respective tooth half which is remote from the tooth tip since the tooth half is shaped from the beginning in such a way that the open end is available.

With the embodiment with the removable tooth tip, however, the open end is produced by means of the removal of the tooth tip, i.e. on the tooth tip side. Both embodiments can each have an advantage. If the component parts of the electrical machine (the linear motor) are fitted in a housing, it may be dependent on the shape of the housing from which side it is desirable to push on the prewound coil. The shape of the tooth half or the capability of modifying said tooth half (by removing the tooth tip) can then be selected depending on this.

The separation of the teeth into tooth halves is preferably at least partially counteractive again in the fitted electrical machine. Thus, an embodiment is possible in which in each case two tooth halves of the same tooth are connected to one another via a connecting element (yoke). It is likewise possible, once coils have been pushed on and magnets have been inserted, for in each case adjacent tooth halves, which belong to different teeth, to be connected to one another via a connecting element. In this embodiment, it is preferable for the connecting element to conduct the magnetic flux. A yoke conducting the magnetic flux can comprise, for example, a stack of laminates (by means of the use of baked enamel, which acts as an adhesive once the stack has been baked in an oven). Such a stacked element also makes it possible for threaded bores to be set. Then, it is particularly possible to fix the yoke in the housing of the electrical machine.

Irrespective of whether the yoke produces a connection between two tooth halves of the same tooth or of adjacent teeth, it can be held in slots of the tooth halves, with, in the first case, the slots naturally needing to be provided in an inner side of the tooth halves, with the inner side pointing in the direction of the magnet pushed between the tooth halves, while in the second case the slots need to be provided in an outer side of the tooth halves, with the outer side being the side facing the coil.

If the yoke is held in slots of the tooth halves and a yoke is used which has been produced by baking laminate parts by means of baked enamel, it is thus possible for threaded bores to be set into the yoke, as a result of which the yoke can be fixed on the housing and then fixing of the tooth halves takes place indirectly via the slot. In this case, the yoke (which can also be referred to as a sliding block in the case of guidance in the slots) absorbs many forces.

Instead of yokes between in each case two adjacent tooth halves, a plate may also be provided which bridges a plurality of teeth. Preferably, the plate is then fastened on the tooth halves. In order to produce a fastening option, the tooth halves should then likewise be produced by baking laminate parts by means of baked enamel in order that a threaded bore can be set.

The invention also includes a specially shaped tooth half. This tooth half has a free end, a desired position for a coil surrounding in each case two identical such tooth halves being defined on the tooth half. The tooth half is shaped in such a way that its thickness from the free end up to the desired position does not exceed the thickness at the desired position, with the result that, when the electrical machine is fitted on two identical such tooth halves, a prewound coil can be pushed on from the free end up to the desired position.

The embodiment of the tooth half with a removable tooth tip is also part of the invention. When the tooth tip is removed, an open end is then provided, the tooth half being shaped, when the tooth tip is removed, in such a way that it is nevertheless possible for a prewound coil to be pushed on from the open end up to a desired position during fitting of the electrical machine.

BRIEF DESCRIPTION OF THE DRAWING

Preferred embodiments of the invention will be described below with reference to the drawing, in which.

DETAILED DESCRIPTION OF PREFERRED EMBODIMENTS

Figure 1A:
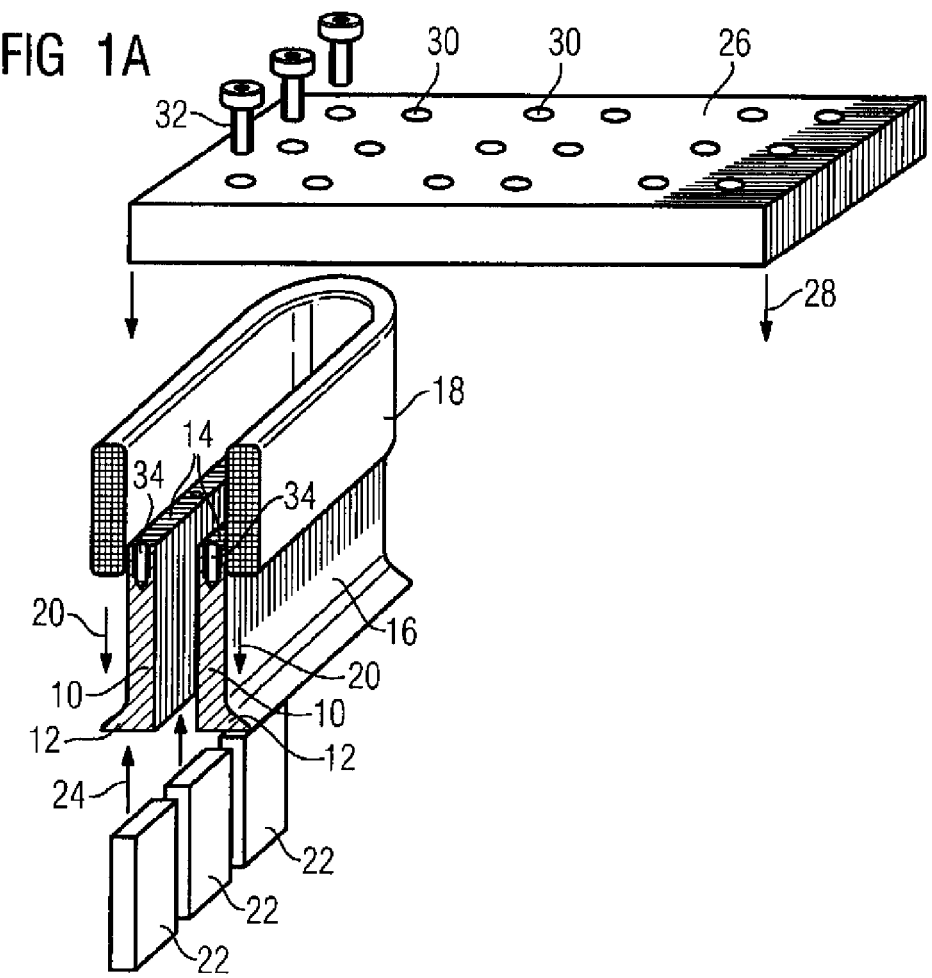
FIG. 1A shows a first embodiment of the method according to the invention in a perspective view in partial section, with the perspective view illustrating the steps of the method starting from the provision of tooth halves according to the invention.

FIG. 1A shows a tooth, which comprises two tooth halves 10. The tooth halves 10 are substantially plate-shaped, in each case widening of the plate shape occurring at the lower end in FIG. 1A, as a result of which tooth tips 12 are formed. In the assembled state, the tooth tips 12 are located on the side on which the interaction of the primary part with the secondary part takes place.

Figure 1B:
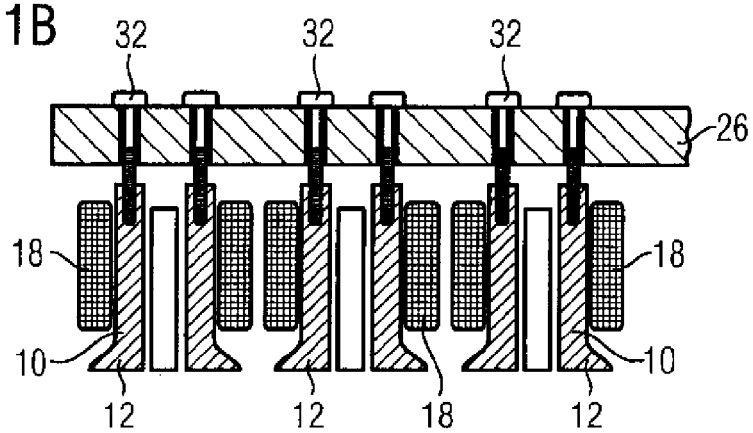
FIG. 1B in comparison with FIG. 1A, illustrates the assembled state.

Owing to the plate shape of the tooth halves 10, a free end 14 is provided. The plate shape has the same thickness at the free end 14 as in a lower region (still above the tooth tips 12), where a coil is intended to be fitted. As a result of the fact that the tooth halves 10, in contrast to the prior art, for example, do not extend in the region of the free end 14 beyond a plane which is defined by the outer side 16 of the plate, it is now possible for a prewound annular coil 18 (shown in section) to be pushed on corresponding to the arrows 20 until the coil 18 has reached a desired position, which is illustrated in FIG. 1B. (The desired position of the coil defines a desired position on the tooth half.) Once the coil 18 has been pushed onto the tooth halves 10, which are already located at the correct distance from one another when the electrical machine is fitted, a permanent magnet can be inserted between the two tooth halves 10. In the present case, three permanent magnets 22 are illustrated, and these permanent magnets are pushed between the two tooth halves 10 (arrows 24). In contrast to the prior art, tooth halves 10 with tooth tips 12 are therefore provided, it being possible for a prewound coil 18 to be pushed on and magnets 22 then to be inserted.

In order to provide a termination, a plate 26 bridging all of the teeth is provided on the free ends 14 of the tooth halves when a large number of teeth is provided. The positioning takes place corresponding to the arrows 28, the fitted state being illustrated in FIG. 1B. The plate 26 may be a purely mechanical way of ensuring stability, but it can in addition also be designed to conduct the magnetic flux which originates from the magnets 22 or else the coil 18 during operation.

In order that the plate 26 can be fastened on the tooth halves 10, threads 30 for screws 32 are provided in the plate 26. Likewise, threads 34 for the screws 32 are provided in the tooth halves 10.

In order to make it possible to drill threads 30 and 34, both the plate 26 and the tooth halves 10 are produced by baking laminate parts by means of baked enamel. In this case, baked enamel is applied to the individual laminate layers. When introducing the apparatus into an oven, the baked enamel changes its properties and in the process produces adhesive joints.

Figure 2A:
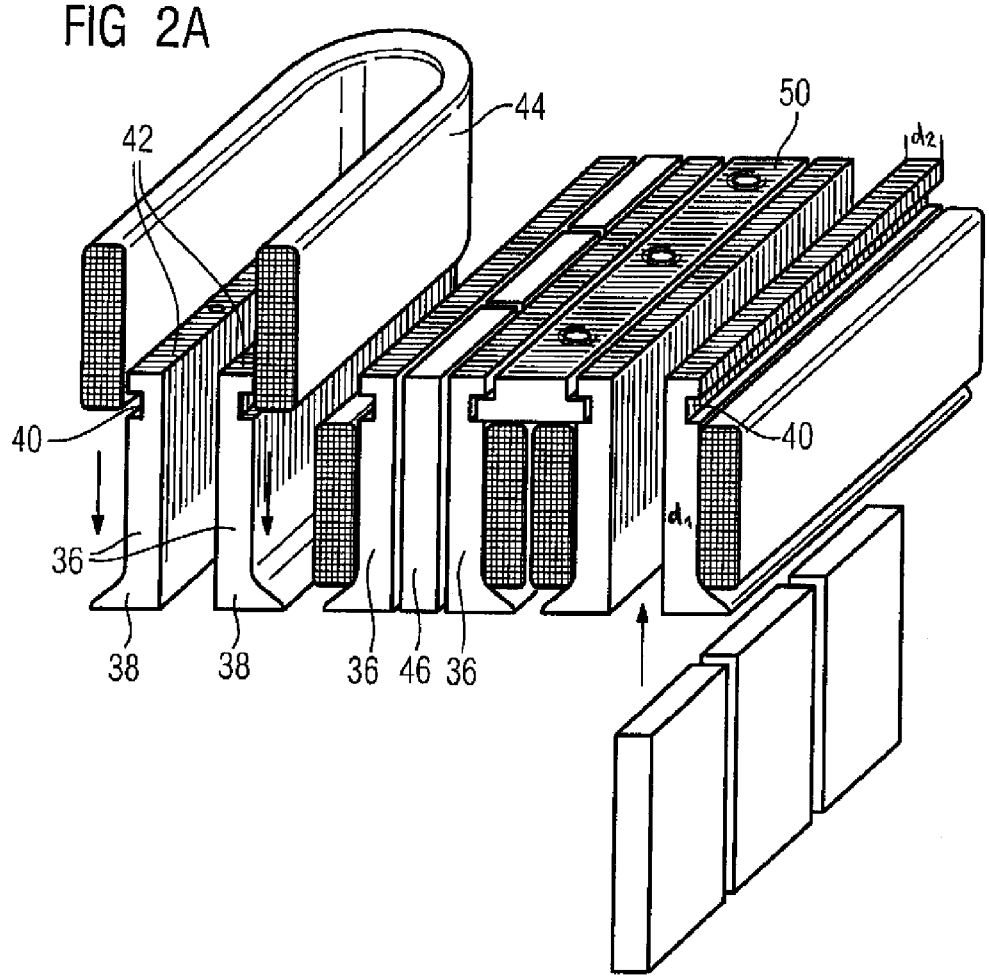
FIG. 2A shows an alternative embodiment of the invention in partial section, with parts of the diagram illustrating the assembly and other parts of the diagram illustrating the assembled state.

FIG. 2A illustrates an alternative embodiment of the tooth halves. The tooth halves 36 shown in FIG. 2A likewise comprise tooth tips 38, which represent a widening in comparison with the basic body of the tooth halves. The actual basic body of the tooth halves 36 is still plate-shaped. In contrast to the embodiment shown in FIG. 1A, however, a slot 40 is provided in the plate shape. The free end 42 of the tooth halves 36 is no thicker than the actual plate-shaped basic body. The thickness $d_2$ illustrated is in particular equal to the thickness $d_1$. The outer side of the tooth halves, which is partially covered by a coil 44 (shown in section) in the representation shown in FIG. 2A, therefore forms a plane, with the exception of the slot 40. In other words, the outer plane of the plate-shaped basic body continues beyond the slot 40 towards the free end 42. The free end 42 is therefore not widened or also does not protrude beyond the outer side of the tooth halves 36.

Correspondingly, it is also possible here to push a coil 44 onto the two tooth halves during fitting when there is at the same time a fitting spacing between the tooth halves 36. The assembled state is shown on the right-hand side in FIG. 2A. Once the coil 44 has been pushed on, it is possible for a magnet 46 to be inserted between two tooth halves of a tooth. In this case, FIG. 2A likewise shows the assembled state in the center of the diagram.

In the embodiment shown in FIG. 2A, there is no termination of the tooth halves 36 by means of a plate bridging all of the teeth in the manner of the plate 26 (FIG. 1A). Instead, the slots 40 are used for holding connecting elements 48 (FIG. 2B) or 50 (FIG. 2C or FIG. 2A, right-hand part of the diagram). Since the slots 40 are provided on the outer side of the tooth halves 36, the connecting elements 48 and 50 each provide a connection between two tooth halves 36, which belong to different teeth.

Figure 2B:
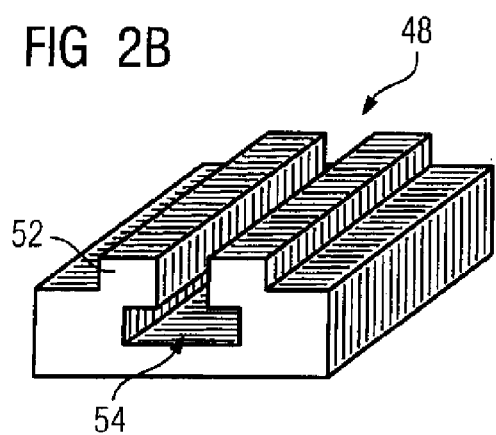
FIG. 2B shows a rear yoke which can be used in the embodiment shown in FIG. 2A.

A rear yoke 48 can be inserted into the slots 40. The rear yoke can serve the purpose of conducting the magnetic flux. The rear yoke at 48, as is shown in FIG. 2B, has substantially the shape of an (inverted) "T" in cross section, with for its part a horizontal T-shaped slot 54 being let into the base 52 of the "T".

Figure 2C:
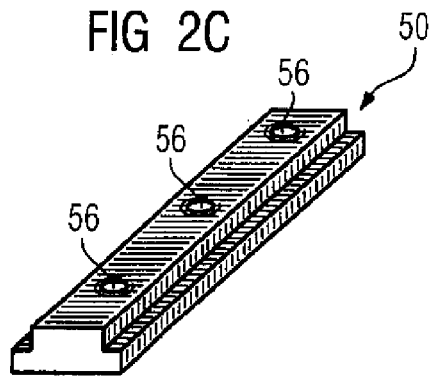
FIG. 2C shows a sliding block which can be used in the embodiment shown in FIG. 2A.

The slot 54 can be used for accommodating a sliding block in the manner of the sliding block 50, as is shown in FIG. 2C, which likewise has a T-shaped cross section. The sliding block is produced by baking laminate parts by means of baked enamel and can therefore have threaded bores 56. If the rear yoke 48 is inserted into the slots 40 and the sliding block 50 into the slot 54 of the rear yoke 48, firstly a magnetic connection between the two tooth halves 36 which provide the slots 40 which hold the rear yoke 48 is produced. Secondly, fastening of the entire apparatus on a housing of the electrical machine is ensured via the threaded bore 56. The sliding block 50 can absorb in particular severe forces which act during operation of the machine and can transfer them to the housing. In an alternative embodiment, the sliding block 50 is designed to be slightly larger and is guided directly in the slots 40 (cf. FIG. 2A). In this case, too, it is used for fastening purposes via the threaded screws 56.

Figure 3:
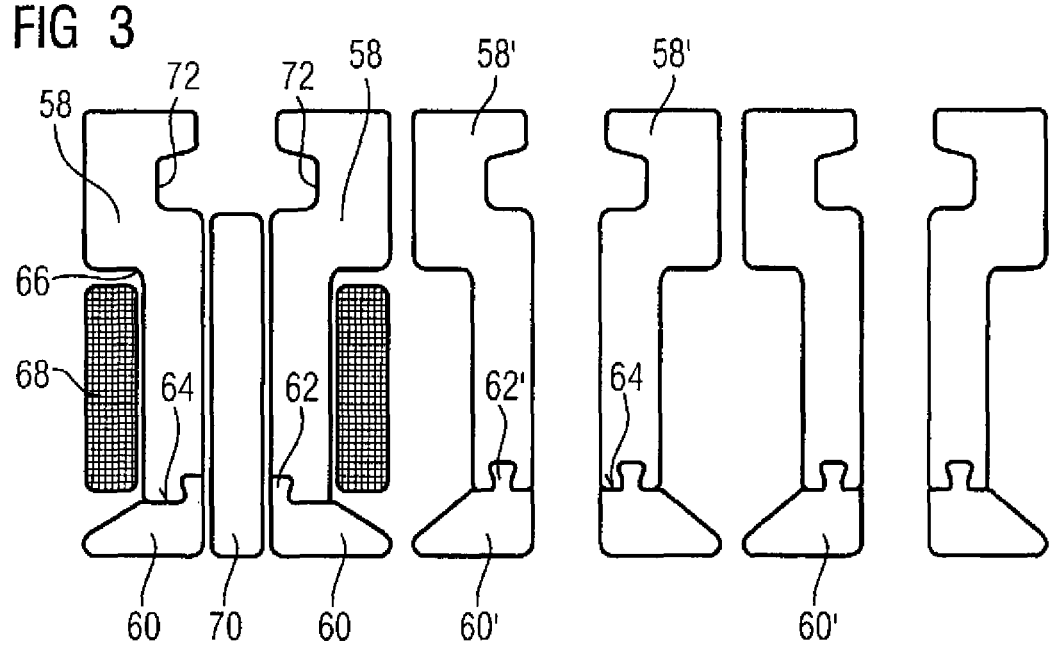
FIG. 3 shows an alternative embodiment of the invention in section.

FIG. 3 illustrates an alternative embodiment of the invention. In this case, tooth halves 58 are provided which have tooth tips 60. The basic shape of the tooth halves 58 corresponds to the prior art with the following exception: The tooth tips 60 are removable.

The tooth tips 60 and 60' are connected to the body of the tooth halves 58 and 58', respectively, via plug-type connections 62 and 62', respectively. A first embodiment is shown on the left-hand side in FIG. 3: The plug-type connections 62 are inserted on the inner side of the respective tooth half 58. In the alternative in accordance with the central tooth in FIG. 3, the plug-type connection 62' of the tooth tip 60 extends into the solid body of the tooth half 58'.

The two mentioned embodiments have the removability of the tooth tips 60 and 60', respectively, in common. When the tooth tips 60 and 60' are removed, an open end of the tooth halves 64, now on the side of the tooth tips 60 and 60', respectively, is provided. (It is merely necessary to imagine that the tooth tips 60 and 60', respectively, are not there for this purpose.) The open end 64 has a thickness which is no wider than the rest of the body of the tooth half 58 up to a half-slot 66, which can be used to hold a coil 68. It is thus possible to plug a completely wound coil 68 onto the two tooth halves 58 which are located in the fitted position from the free end 64 when the tooth tip 60 (or 60') is removed, until the prewound coil 68 finds a hold in the half-slot 66. Then, a permanent magnet 70 can be inserted into a gap between the two tooth halves 58.

The embodiment according to the invention with a removable tooth tip therefore likewise makes the method according to the invention possible, with in this case the coil being pushed on from the tooth tip side because the tooth tip is indeed removable. Slots 72 are also provided in the tooth halves 58, but this time on the inner side of the tooth halves 58, which inner side faces the magnet 70, to be precise directly above the magnet 70. In this case, too, the slots 72 make it possible to insert a rear yoke in accordance with the rear yoke 48 in FIG. 2B, or a sliding block 50, as is shown in FIG. 2C.

The three different embodiments of the invention each provide the possibility of pushing prewound coils as a whole onto tooth tip halves. Magnets can then comfortably be inserted into a corresponding gap between the tooth tip halves.

What is claimed is:

1. A method for constructing a linear motor, comprising the steps of:
   providing a plurality of teeth, each of which having two separate tooth halves, each tooth half having a removable tooth tip;
   removing the tooth tips from the tooth halves to expose an open end of the tooth halves;
   pushing a prewound coil over the open end of the two tooth halves of each tooth up to an end position; and
   inserting a magnet between the two tooth halves of each tooth,
   wherein the tooth halves have a thickness between the open end and the end position which does not exceed a thickness of the tooth halves at the end position.

2. The method as claimed in claim 1, further comprising the step of connecting the two tooth halves of each tooth to one another via a yoke after the inserting step.

3. The method as claimed in claim 2, further comprising the step of holding the yoke in slots of the tooth halves.

4. The method as claimed in claim 1, further comprising the step of connecting adjacent tooth halves of different teeth to one another via a yoke conducting a magnetic flux.

5. The method as claimed in claim 4, further comprising the step of baking laminate parts by means of baked enamel to produce the yoke.

6. The method as claimed in claim 4, further comprising the step of holding the yoke in slots of the tooth halves.

* * * * *